(12) United States Patent
Harinath

(10) Patent No.: US 7,730,024 B2
(45) Date of Patent: Jun. 1, 2010

(54) DISTRIBUTED DATA MINING USING ANALYSIS SERVICES SERVERS

(75) Inventor: Sivakumar Harinath, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 149 days.

(21) Appl. No.: 11/384,800

(22) Filed: Mar. 20, 2006

(65) Prior Publication Data

US 2007/0219947 A1    Sep. 20, 2007

(51) Int. Cl.
*G06F 17/30* (2006.01)
(52) U.S. Cl. .................. 707/608; 707/694; 707/810
(58) Field of Classification Search ............... 707/104.1
See application file for complete search history.

(56) References Cited

U.S. PATENT DOCUMENTS

| | | | |
|---|---|---|---|
| 5,758,147 A | 5/1998 | Chen et al. | |
| 6,286,005 B1 | 9/2001 | Cannon | |
| 6,687,693 B2 | 2/2004 | Cereghini et al. | |
| 6,708,163 B1* | 3/2004 | Kargupta et al. | 707/3 |
| 6,732,099 B1 | 5/2004 | Levanoni et al. | |
| 7,305,378 B2* | 12/2007 | Aggarwal et al. | 707/1 |
| 2002/0046273 A1 | 4/2002 | Lahr et al. | |
| 2002/0188669 A1 | 12/2002 | Levine | |
| 2004/0193576 A1* | 9/2004 | Petculescu et al. | 707/3 |
| 2004/0215598 A1* | 10/2004 | Bala | 707/2 |
| 2005/0114360 A1 | 5/2005 | Russell et al. | |
| 2007/0011135 A1* | 1/2007 | Chitgupakar et al. | 707/1 |

OTHER PUBLICATIONS

Kargupta et al., "PADMA: Parallel Data Mining Agents for Scalable Text Classification", High Performance Computing, 1997.*
Wikipedia: Microsoft SQL Server 2005 Analysis Services, Retrieved Aug. 8, 2008.*
Zaidi, et al. "Distributed Data Mining From Heterogeneous Healthcare Data Repositories: Towards an Intelligent Agent-Based Framework" (2002) Symposium on Computer-Based Medical Systems, 4 pages.
MSDN. "SQL Server 2005: Unearth the New Data Mining Features of Aalysis" http://msdn.microsoft.com/msdnmag/issues/04/09/AnalysisServices2005/default.aspx last viewed Dec. 20, 2005, 6 pages.
Microsoft Windows Server System. "Analysis Services Overview" http://www.microsoft.com/sql/technologies/analysis/overview.mspx last viewed Mar. 20, 2006, 3 pages.

* cited by examiner

*Primary Examiner*—Cam Y T Truong
(74) *Attorney, Agent, or Firm*—Workman Nydegger

(57) ABSTRACT

An Analysis Services server component that facilitates data mining using Analysis Services in a distributed environment is provided. The Analysis Services server component can be a component of a distributed Analysis Services system for distributed data mining. The distributed Analysis Services system can provide support for collaboration between multiple Analysis Services server components having similar models that can be shared for collaborative work.

Data can be distributed to a plurality of Analysis Services server components so that multiple data mining models can be built on the server components based on certain parameters (e.g., number of servers to use, accuracy details etc. as algorithmic parameters). Based on that when a model is being processed, data can be shipped across multiple Analysis Services server components and multiple models can be built. During prediction these analysis services server components can collaborate between them to give the prediction results by different mechanisms.

8 Claims, 8 Drawing Sheets

DISTRIBUTED DATA MINING USING ANALYSIS SERVICES SERVERS

BACKGROUND

Increasing advances in computer technology (e.g., microprocessor speed, memory capacity, data transfer bandwidth, software functionality, and the like) have generally contributed to increased computer application in various industries. Ever more powerful server systems, which are often configured as an array of servers, are often provided to service requests originating from external sources such as the World Wide Web, for example. As local Intranet systems have become more sophisticated thereby requiring servicing of larger network loads and related applications, internal system demands have grown accordingly as well. As such, much business data is stored in databases, under the management of a database management system (DBMS). For such DBMS systems, a demand for database transaction processing capacity in large installations has been growing significantly.

Thus, computers have become a necessary tool for many applications throughout the world. Typewriters and slide rules have become obsolete in light of keyboards coupled with sophisticated word-processing applications and calculators that include advanced mathematical functions/capabilities. Trending applications, analysis applications, and other applications that previously may have required a collection of mathematicians or other high-priced specialists to painstakingly complete by hand can now be accomplished through use of computer technology. For instance, due to ever-increasing processor and memory capabilities, if data is entered properly into an application/wizard, such application/wizard can automatically output a response nearly instantaneously (in comparison to hours or days generating such response by hand previously required).

Furthermore, through utilization of computers, vast magnitudes of data can be obtained for analysis and predictive purposes. For example, a retail sales establishment can employ a data analysis application to track sales of a particular good given a particular type of customer, income level of customers, a time of year, advertising strategy, and the like. More particularly, patterns within collected data can be determined and analyzed, and predictions relating to future events can be generated based upon these patterns.

Analysis of data, recognition of patterns, and generation of predictions based at least in part upon the recognized patterns can be collectively referred to as data mining. To enable data mining, various models can be programmed and trained. For instance, data previously collected can be employed as training data for one or more data mining models. The data mining models can employ various predictive analysis algorithms and can further utilize suitable clustering algorithms to cluster data analyzed by the data mining models.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An analysis services server component that facilitates data mining using analysis services in a distributed environment is provided. "Analysis services" refers to a set of tools that facilitate enrichment of data and the building of complex business analytics. Analysis services can provide a business semantic model, referred to as a Unified Dimensional Model (UDM), that defines business entities, business logic, calculations, and metrics. Data mining allows user(s) to explore data, for example, to discover patterns, and apply these patterns (e.g., to business).

In many scenarios, viewing of data is not sufficient. Business value comes from using it to make better informed decisions more quickly, and creating more realistic business plans. Further, on-line analytical processing (OLAP) application requirements include much more than just viewing history with different levels of aggregation. Typically, the purpose of Analysis Services is often to make decisions about the future, not simply to review the past.

Optionally, the Analysis Services server component can be a component of a distributed Analysis Services system that can facilitate a distributed data mining platform. The distributed Analysis Services system can provide support for collaboration between multiple Analysis Services server components having similar models that can be shared for collaborative work.

Additionally and/or alternatively, data can be distributed to a plurality of Analysis Services server component (e.g., after initial design) so that multiple data mining models can be built on the plurality of Analysis Services server components based on certain parameters (e.g., number of servers to use, accuracy details etc. as algorithmic parameters). When a model is being processed, data can be shipped across multiple analysis services server components and multiple models can be built. During prediction these analysis services server components can collaborate between them to give the prediction results by different mechanism(s) (e.g., voting for majority).

With the increasing volume of data being collected, it has become increasingly difficult to mine large data sets in a short period of time. Additionally, there can be security/privacy concerns related to the access of underlying data. Accordingly, faster results and/or more accurate predictive models can be achieved by providing data mining using Analysis Services server components in a distributed environment.

The Analysis Services server component includes a communication component that facilitates communication, for example, with other Analysis Services server component(s), user(s) and/or an Analysis Services central server. The Analysis Services server component further includes a model component that can be employed to perform data mining and/or predictive analysis of data stored in a data store. For example, in a collaborative scenario, the communication component can receive information regarding a data model to be employed by the model component.

The Analysis Services server component can, optionally, include a security component that enforces a security policy based, for example, upon parameter(s) provided by an administrator. Frequently, data stores include sensitive information, for example, patient names, social security numbers, credit card numbers etc. With the security component, an administrator can set a security policy which limits information exposed by the model component.

Optionally, the Analysis Services server component can be a component of a collaborative distributed Analysis Services system. The system includes a plurality of Analysis Services server component that communicate amongst themselves via a communication channel (e.g., the Internet, an intranet, an extranet etc.). With the system, any one of the Analysis Services server component can initiate collaboration with one or more Analysis Services server components that can have similar models that can be shared for collaborative work. For example, the initiating Analysis Services server component can provide information associated with a particular model to be employed by each of the particular collaborative Analysis Services server components to be employed in performing data mining/analysis of the data store associated with that particular component. The information can be, for example, an identifier of a particular model to be employed. Additionally and/or alternatively, the information can be a particular algorithm to be employed by the particular collaborative analysis services server components.

After performing the data mining requested by the initiating Analysis Services server component, each of the collaborative Analysis Services server components can provide their results and/or make their results available (e.g., via a query command) to the primary Analysis Services server components (e.g., initiating component and/or one or more of the other Analysis Services server component(s)).

With the system, a user of the initiating Analysis Services server component can perform data mining via a second Analysis Services server component. Information exposed to the initiating Analysis Services server component can be defined by a security policy on the second Analysis Services server component (e.g., blocking access to confidential, private and/or sensitive information).

Similarly, the Analysis Services server component can be a component of a distributed Analysis Services system that includes an Analysis Services central server and one or more Analysis services server components. The central server can be an Analysis Services server component configured as a central server. The central server can distribute data to the Analysis Services server components so that multiple data mining models are built on several servers based on certain parameters.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

DETAILED DESCRIPTION

Figure 1:
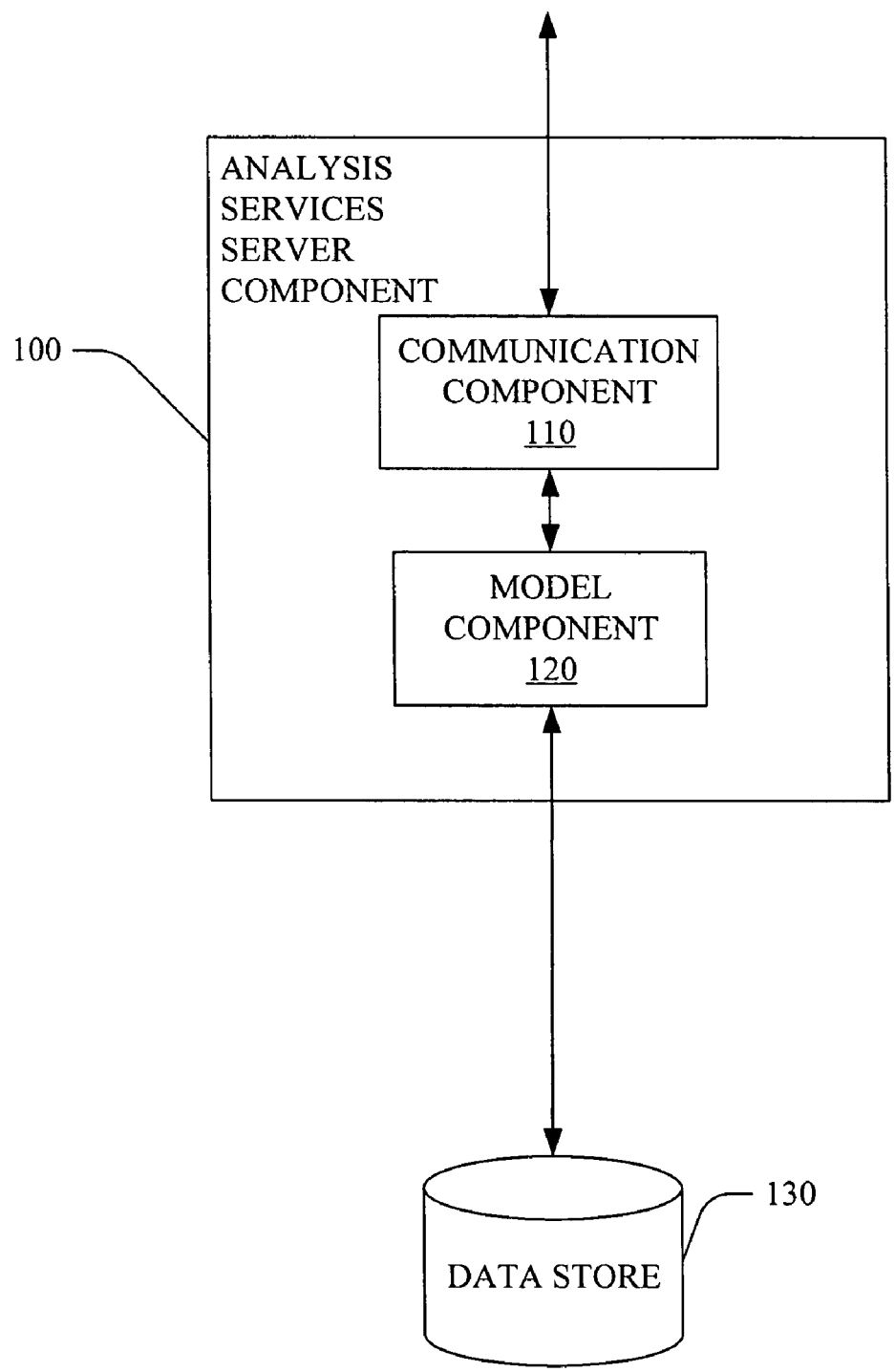
FIG. 1 is a block diagram of an Analysis Services server component that facilitates data mining using analysis services in a distributed environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Referring to FIG. 1, an Analysis Services server component 100 that facilitates data mining using Analysis Services in a distributed environment is illustrated. "Analysis services" refers to a set of tools that facilitate enrichment of data and the building of complex business analytics. Analysis Services can provide a business semantic model, referred to as a Unified Dimensional Model (UDM), that defines business entities, business logic, calculations, and metrics. As noted previously, data mining allows user(s) to explore data, for example, to discover patterns, and apply these patterns (e.g., to business).

In many scenarios, viewing of data is not sufficient. Business value comes from using it to make better informed decisions more quickly, and creating more realistic business plans. Further, on-line analytical processing (OLAP) application requirements include much more than just viewing history with different levels of aggregation. Typically, the purpose of Analysis Services is often to make decisions about the future, not simply to review the past.

As discussed in greater detail below, the Analysis Services server component 100 can be a component of a distributed analysis services system that can facilitate distributed data mining. Accordingly, the distributed analysis services system can provide support for collaboration between multiple analysis servers server components 100 having similar models that can be shared for collaborative work.

Additionally and/or alternatively, data can be distributed to a plurality of analysis services server component 100 after initial design so that multiple data mining models can be built on the plurality of analysis services server components 100 based on certain parameters (e.g., number of servers to use, accuracy details etc. as algorithmic parameters). Based on that when a model is being processed (especially large data sets), data can be shipped across multiple analysis services server components 100 and multiple models can be built. During prediction these Analysis Services server components 100 can collaborate between them to give the prediction results by different mechanism(s) (e.g., voting for majority).

With the increasing volume of data being collected, it has become increasingly difficult to mine large data sets in a short period of time. Additionally, there can be security/privacy concerns related to the access of underlying data. Accordingly, faster results and/or more accurate predictive models can be achieved by providing data mining using analysis services server components 100 in a distributed environment.

The Analysis Services server component 100 includes a communication component 110 that facilitates communication, for example, with other analysis server component(s) 100, user(s) (not shown) and/or an analysis services central server (not shown). The Analysis Services server component 100 further includes a model component 120 that can be employed to perform data mining and/or predictive analysis of data stored in a data store 130. For example, in a collaborative scenario, the communication component 110 can receive information regarding a data model to be employed by the model component 120.

Figure 2:
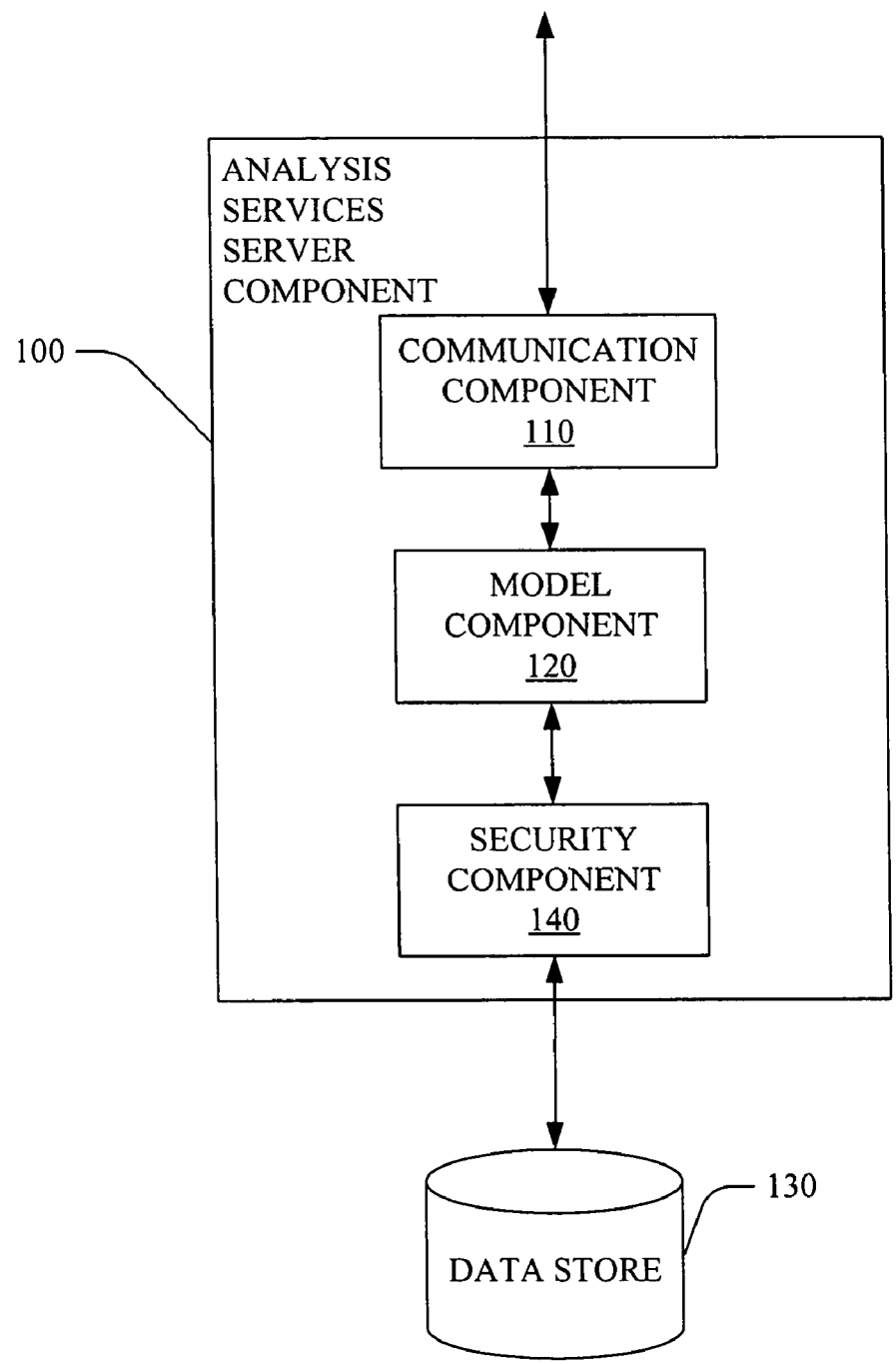
FIG. 2 is a block diagram of an Analysis Services server component that facilitates data mining using. Analysis Services in a distributed environment.

Turning briefly to FIG. 2, the Analysis Services server component 100 can, optionally, include a security component 140 that enforces a security policy based, for example, upon parameter(s) provided by an administrator. Frequently, data stores 130 include sensitive information, for example, patient names, social security numbers, credit card numbers etc. With the security component 140, an administrator can set a security policy which limits information available via the model component 120.

Figure 3:
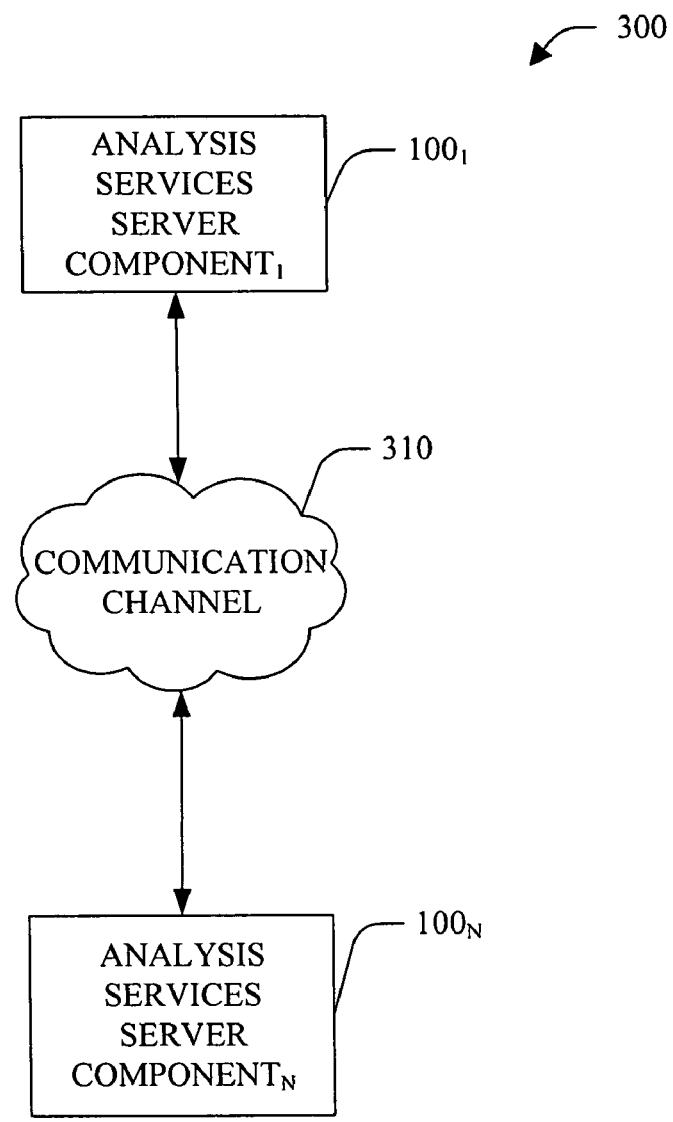
FIG. 3 is a block diagram of a collaborative distributed Analysis Services system.

Referring to FIG. 3, a collaborative distributed Analysis Services system 300 is illustrated. The system 300 includes a plurality of Analysis Services server component 100 that communicate amongst themselves via a communication channel 210. The communication channel 210 can be, for example, the Internet, an intranet, an extranet etc.

With the system 300, any one of the Analysis Services server component 100 can initiate collaboration with one or more Analysis Services server components 100 that can have similar models that can be shared for collaborative work. For example, the initiating Analysis Services server component 100 can provide information associated with a particular model to be employed by each of the particular collaborative analysis services server components 100 to be employed in performing data mining/analysis of the data store 130 associated with that particular component 100. The information can be, for example, an identifier of a particular model to be employed. Additionally and/or alternatively, the information can be a particular algorithm to be employed by the particular collaborative analysis services server components 100.

After performing the data mining requested by the initiating Analysis Services server component 100, each of the collaborative Analysis Services server components 100 can provide their results and/or make their results available (e.g., via a query command) to the analysis services server components 100 (e.g., initiating component 100 and/or one or more of the other analysis services server component(s) 100).

Additionally, with the system 300, a user of the initiating Analysis Services server component 100 can perform data mining via a second Analysis Services server component 100. Information exposed to the initiating Analysis Services server component 100 can be defined by a security policy on the second Analysis Services server component 100 (e.g., blocking access to confidential information). For example, a user associated with a first health care organization can perform data mining a second health care organization's data store 130 without violating patient confidentiality.

Figure 4:
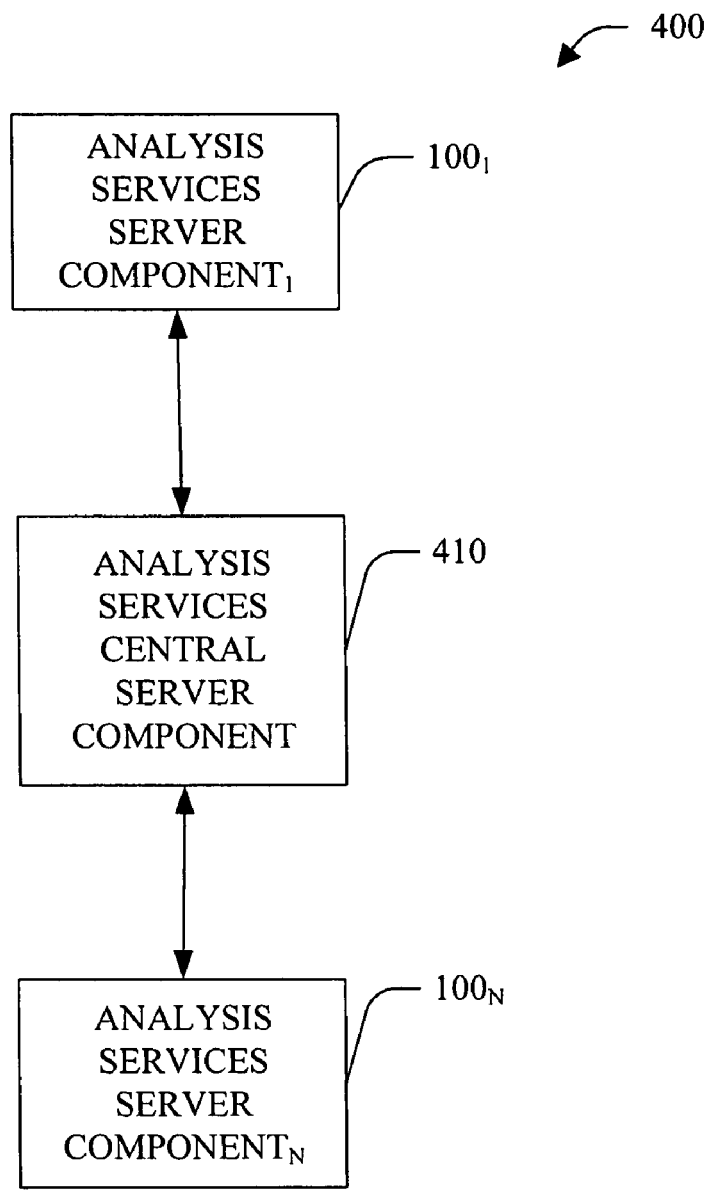
FIG. 4 is a block diagram of a distributed Analysis Services system.

Referring next to FIG. 4, a distributed Analysis Services system 400 is illustrated. The system 400 includes an analysis services central server 410 and one or more Analysis Services server component(s) 100. The central server 410 can be an analysis services server component 100 configured as a central server.

In this example, the central server 410, can distribute data to the Analysis Services server component(s) 100 after initial design so that multiple data mining models are built on several servers 100 based on certain parameters (e.g., number of servers to use, accuracy details etc as algorithmic parameters). Based on that when a model is being processed (especially large data sets), data is shipped across multiple servers or the other servers can retrieve the data from the data source based on the connection details provided by the central Analysis Services server component and multiple models are built. During prediction, the Analysis Services server component(s) 100 collaborate with the central server 410 and, optionally, between themselves to give the prediction results by different mechanisms (e.g., voting for majority etc.).

It is to be appreciated that the Analysis Services server component 100, the communication component 110, the model component 120, the data store 130, the security component 140, the system 300, the communication channel 310, the system 400 and/or the analysis services central server 410 can be computer components as that term is defined herein.

Figure 5:
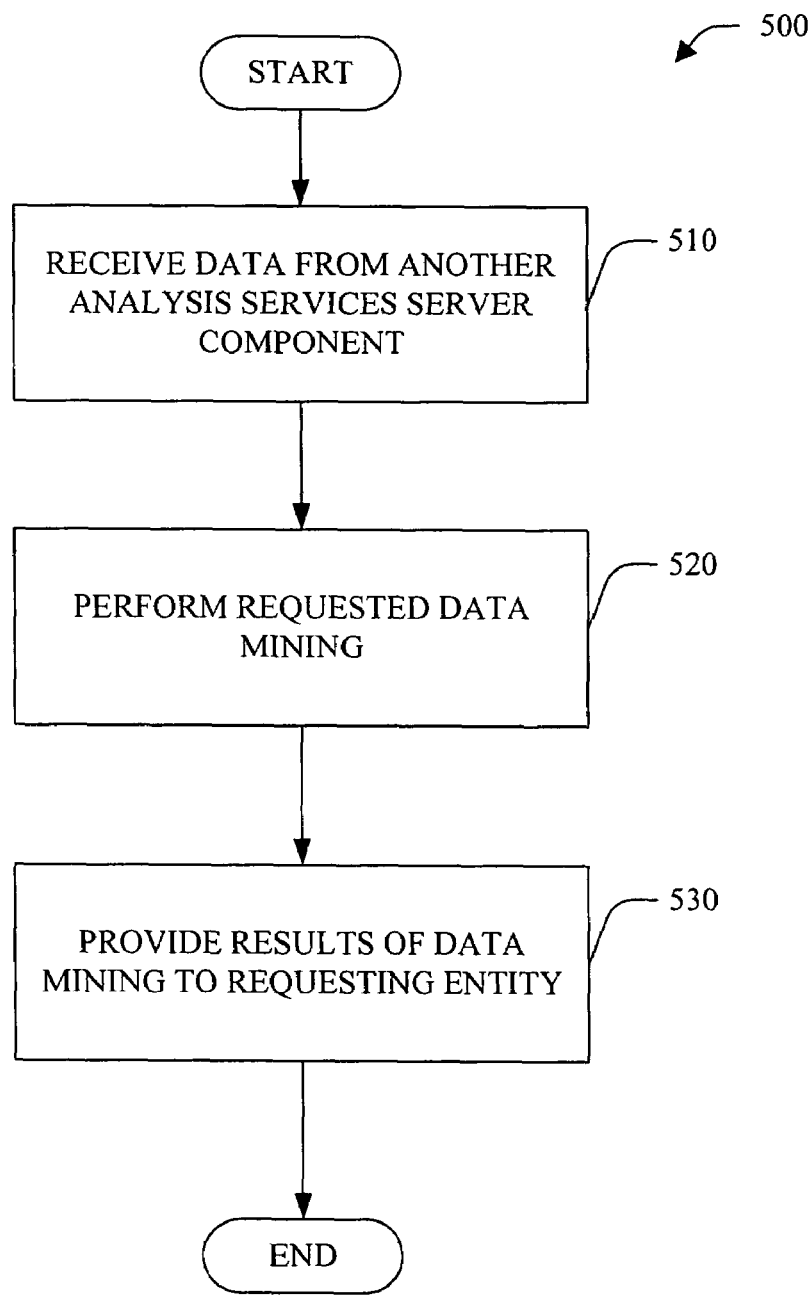
FIG. 5 is a flow chart of a method of performing distributed data mining using Analysis Services.
Figure 6:
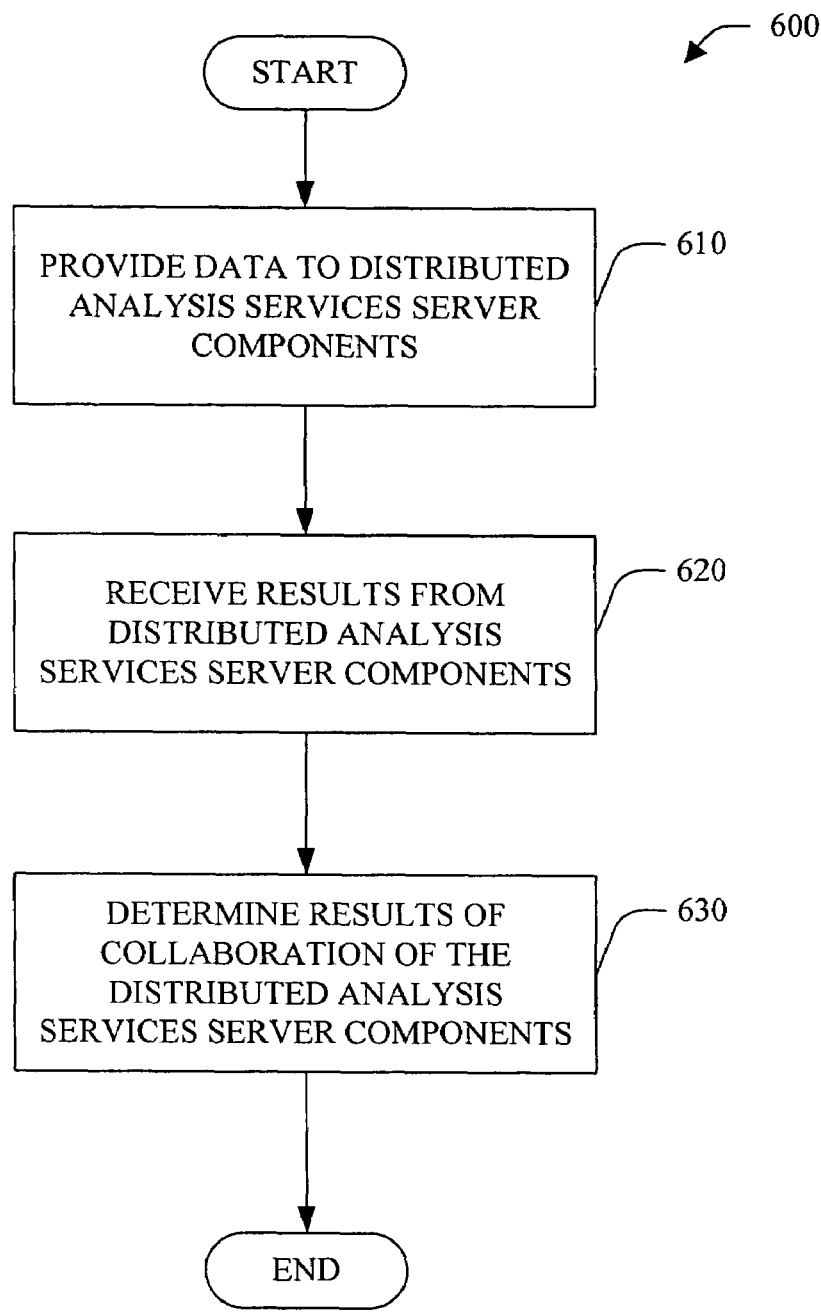
FIG. 6 is a flow chart of a method of performing distributed data mining using Analysis Services.

Turning briefly to FIGS. 5 and 6, methodologies that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 5, a method of performing distributed data mining using Analysis Services is illustrated. At 510, data is received from an Analysis Services server component (e.g., Analysis Services server component 100 and/or Analysis Services central server 410). At 520, data mining requested by the Analysis Services server component is performed. At 530, results of the data mining are provided to the requesting entity.

Next, turning to FIG. 6, a method of performing distributed data mining using Analysis Services is illustrated. At 610, data is provided to a plurality of Analysis Services server components (e.g., Analysis Services server components 100). For example, the data provided to the plurality of Analysis Services server components can include information associated with a model to be employed by the plurality of Analysis Services server components.

At 620, results are received from the plurality of Analysis Services server components (e.g., distributed components). At 630, the results of collaboration of the distributed Analysis Services server components are determined. For example, the results received from the plurality of Analysis Services server components can be filtered in determining the result of collaboration. Thereafter, optionally, predictive analysis can be performed based on the result of collaboration.

Figure 7:
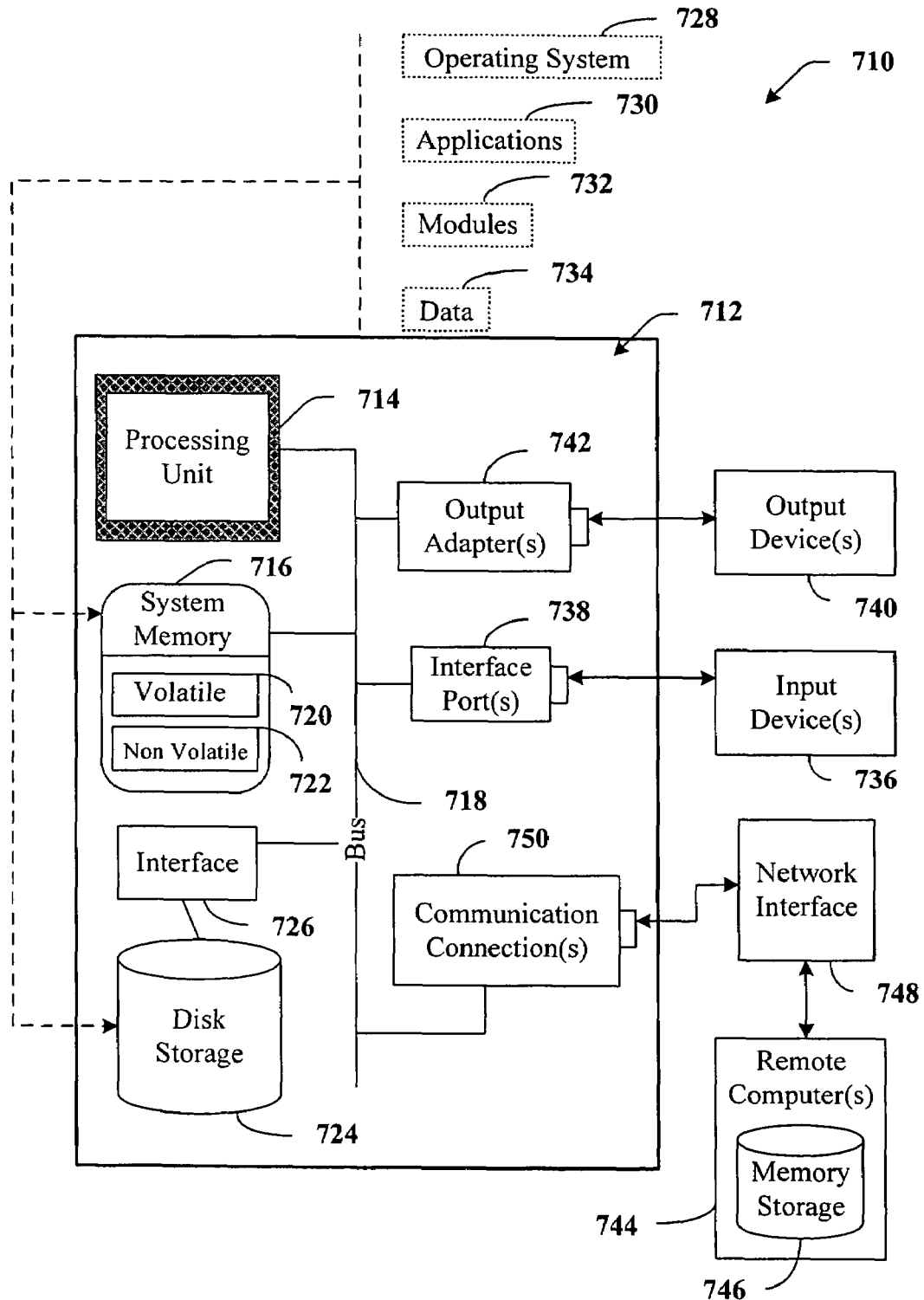
FIG. 7 illustrates an example operating environment.

In order to provide additional context for various aspects of the claimed subject matter, FIG. 7 and the following discussion are intended to provide a brief, general description of a suitable operating environment 710. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 710 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 7, an exemplary environment 710 includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/nonremovable, volatile/nonvolatile computer storage media. FIG. 7 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the claimed subject matter can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers among other output devices 740 that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

Figure 8:
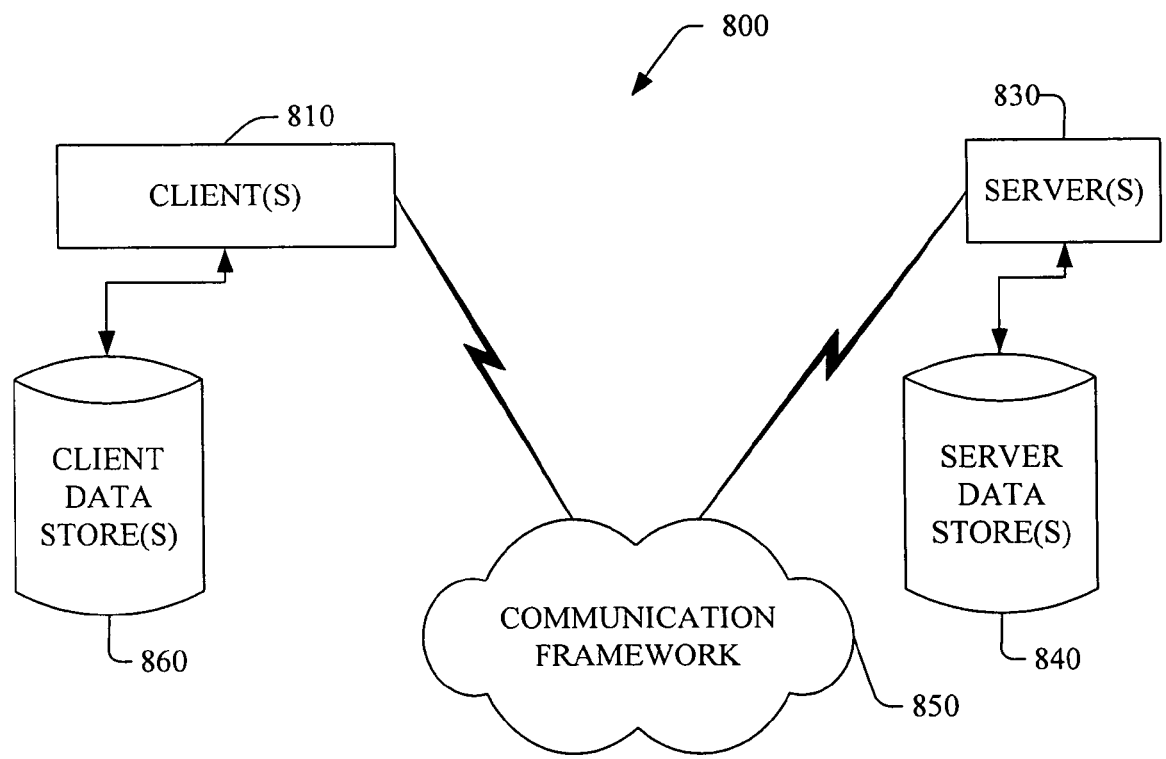
FIG. 8 illustrates another example operating environment.

FIG. 8 is a schematic block diagram of a sample-computing environment 800 with which the claimed subject matter can interact. The system 800 includes one or more client(s) 810. The client(s) 810 can be hardware and/or software (e.g., threads, processes, computing devices). The system 800 also includes one or more server(s) 820. The server(s) 820 can be hardware and/or software (e.g., threads, processes, computing devices). The servers 820 can house threads to perform transformations by employing the subject innovation, for example.

One possible communication between a client 810 and a server 820 can be in the form of a data packet adapted to be transmitted between two or more computer processes. The system 800 includes a communication framework 840 that can be employed to facilitate communications between the client(s) 810 and the server(s) 820. The client(s) 810 are operably connected to one or more client data store(s) 850 that can be employed to store information local to the client(s) 810. Similarly, the server(s) 820 are operably connected to one or more server data store(s) 830 that can be employed to store information local to the servers 820.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer program product stored in one or more computer readable storage media encoded with computer-executable instructions which executed upon one or more computer processer, the computer program product comprising:

an Analysis Services server component;

a component that builds data mining models on a plurality of Analysis Service server components based on parameters;

a communication component that communicates with another Analysis Service server component in a distributed environment facilitating initiation of a collaboration between a plurality of Analysis System server components by any of communicating Analysis System server components;

a model component that receives a data mining request and receives information regarding a data mining model of the data mining from a requestor, performs the data mining request, receives results of the data mining request from the plurality of Analysis Service server components, provides the results of the data mining request to the requestor, and employs the received information regarding the data mining model, wherein information associated with the data mining request comprises the data mining model to be employed by the Analysis Service server component, wherein the model component further comprises a unified dimensional model that defines business entitles, business logic, calculations and metrics employed for data mining, wherein the Analysis System server components is an Analysis System central server component that distributes the information associated with the data mining request to the plurality of Analysis System server components;

a security component that enforces a security policy and limits information exposed by the model component according to the security policy, the limiting is based at least in part upon one or more parameters provided by an administrator, for the results of the data mining request;

a component that requests from the plurality of Analysis Services server components for determining, upon the results received from the plurality of Analysis Services server components, a result of collaboration of the distributed plurality of Analysis Services server components, and wherein the result of the collaboration is filtered in determining for performing predictive analysis by the analysis services central server component, wherein the plurality of Analysis Services server components communicate with one another to perform collaborative data mining.

2. The computer program product of claim 1, wherein the Analysis Services server component further collaborates with another Analysis Services server component with respect to the result of the data mining.

3. The computer program product of claim 1, wherein the information associated with the data mining request comprising data to be employed by the Analysis Services server component.

4. A system comprising one or more computer-readable storage media encoded with program computer-executable instructions for a distributed Analysis Services system, the system comprising:

a processor;

an Analysis Services server component;

a component that builds data mining models on a plurality of Analysis Services server components based on parameters;

a communications component that communicates with another Analysis Services server component in a distributed environment facilitating initiation of a collaboration between a plurality of Analysis System sever components by any of communicating Analysis System server components;

a model component that receives a data mining request and information regarding a data mining model of the data mining models from a requestor, performs the data mining request, receives results of the data mining request from the plurality of Analysis Services server components, provides the results of the data mining request to the requestor, and employs the received information regarding the data mining model, wherein information associated with the data mining request comprises the data mining model to be employed by the Analysis Services server component, wherein the model component further comprises a unified dimensional model that defines business entities, business logic, calculations and metrics employed for data mining, wherein the Analysis Services server component is an Analysis Services central server component that distributes the information associated with the data mining request to the plurality of Analysis Services server components;

a security component that enforces a security policy and limits information exposed by the model component according to the security policy, the limiting is based at least in part upon one or more parameters provided by an administrator, for the results of the data mining request;

a component that requests from the plurality of Analysis Services server components for determining, upon the results received from the plurality of Analysis Services server components, a result of collaboration of the distributed plurality of Analysis Services server components, and wherein the result of the collaboration is filtered in determining for performing predictive analysis by the analysis services central server component, wherein the plurality of Analysis Services server components communicate with one another to perform collaborative data mining.

5. The system of claim 4, wherein the plurality of Analysis Services server components communicate with one another to perform collaborative data mining.

6. The system of claim 4, wherein the Analysis Services central server component filters the results received from the plurality of Analysis Services server components in determining the result of collaboration.

7. A method of performing distributed data mining using a plurality of Analysis Services server components, the method comprising:

building data mining models on the plurality of Analysis Services server components based on parameters;

communicating with an Analysis Services server component in a distributed environment facilitating initiation of a collaboration between a plurality of Analysis System sever components by any of communicating Analysis System server components;

receiving a data mining request and information regarding a data mining model of the data mining models from a requestor;

performing the data mining request and receiving results of the data mining request from the plurality of Analysis Services server components;

providing by using a model component, the results of the data mining request to the requestor, and employing the received information regarding the data mining model, wherein information associated with the data mining request comprises the data mining model to be employed by the Analysis Services server component, wherein the model component further comprises a unified dimensional model that defines business entities, business logic, calculations and metrics employed for data mining, wherein the Analysis Services server component is an Analysis Services central server component that distributes the information associated with the data mining request to the plurality of Analysis Services server components;

enforcing a security policy and limiting information exposed by the model component according to the security policy, the limiting is based at least in part upon one or more parameters provided by an administrator, for the results of the data mining request;

requesting from the plurality of Analysis Services server components for determining, upon the results received from the plurality of Analysis Services server components, a result of collaboration of the distributed plurality of Analysis Services server components;

filtering the result of the collaboration in determining for performing predictive analysis by the analysis services central server component, wherein the plurality of Analysis Services server components communicate with one another to perform collaborative data mining; and returning the result of collaboration to the requestor.

8. The method of claim 7, further comprising filtering the results received from the plurality of Analysis Services server components in determining the result of collaboration.

* * * * *

UNITED STATES PATENT AND TRADEMARK OFFICE
CERTIFICATE OF CORRECTION

| | | |
|---|---|---|
| PATENT NO. | : 7,730,024 B2 | Page 1 of 1 |
| APPLICATION NO. | : 11/384800 | |
| DATED | : June 1, 2010 | |
| INVENTOR(S) | : Sivakumar Harinath | |

It is certified that error appears in the above-identified patent and that said Letters Patent is hereby corrected as shown below:

In column 9, line 54, in Claim 1, delete "Service" and insert -- Services --, therefor.

In column 9, line 56, in Claim 1, delete "communication" and insert -- communications --, therefor.

In column 9, line 57, in Claim 1, delete "Service" and insert -- Services --, therefor.

In column 9, line 66, in Claim 1, delete "Service" and insert -- Services --, therefor.

In column 10, line 5, in Claim 1, delete "Service" and insert -- Services --, therefor.

In column 10, line 7, in Claim 1, delete "entitles," and insert -- entities, --, therefor.

In column 10, line 9, in Claim 1, delete "System server components" and insert -- Services server component --, therefor.

In column 10, line 10, in Claim 1, delete "System" and insert -- Services --, therefor.

In column 10, line 12, in Claim 1, delete "System" and insert -- Services --, therefor.

Signed and Sealed this
Eighth Day of March, 2011

David J. Kappos
*Director of the United States Patent and Trademark Office*